F. CAPDEVILA.
ADJUSTABLE MIRROR.
APPLICATION FILED JUNE 9, 1913.
1,220,069.
Patented Mar. 20, 1917.
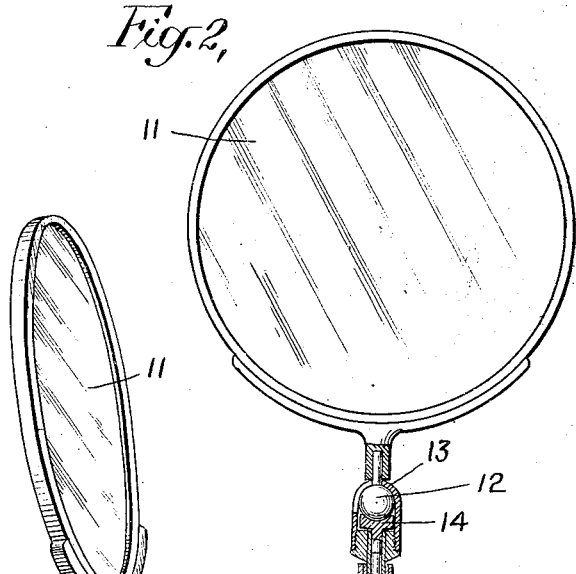
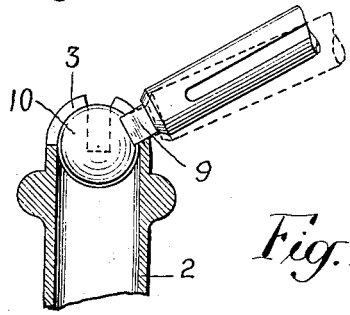
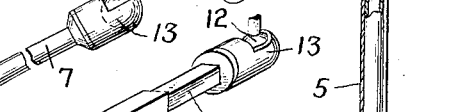
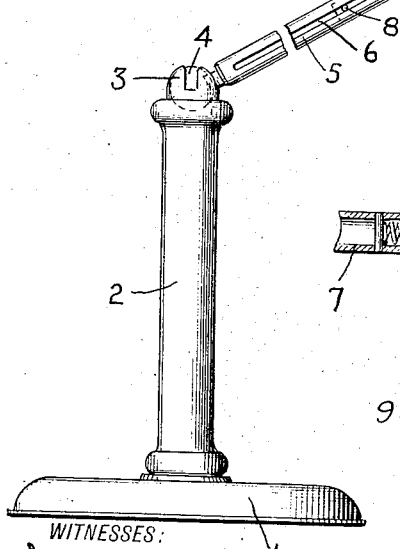
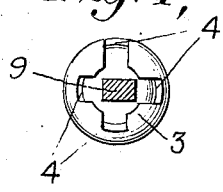
WITNESSES:
INVENTOR
Frank Capdevila
BY
ATTORNEYS

UNITED STATES PATENT OFFICE.

FRANK CAPDEVILA, OF NEW YORK, N. Y.

ADJUSTABLE MIRROR.

1,220,069.  Specification of Letters Patent.  Patented Mar. 20, 1917.

Application filed June 9, 1913. Serial No. 772,559.

*To all whom it may concern:*

Be it known that I, FRANK CAPDEVILA, a subject of the King of Spain, residing at No. 248 West Forty-fifth street, borough of Manhattan, city, county, and State of New York, have invented certain new and useful Improvements in Adjustable Mirrors; and I do hereby declare the following to be a full, clear, and exact description of the invention, such as will enable others skilled in the art to which it appertains to make and use the same.

The present invention relates to adjustable mirrors particularly for toilet use, wherein the mirror may be extended from a compacted arrangement to an extended position which is adjustable over a wide range and through a wide angle merely by pulling out an arm carrying the mirror and fixing the arm to the desired inclination relatively to a base or support, and fixing the mirror to the desired angle relatively to the arm.

In the preferred form of construction shown herein, the base is provided with a column having an inturned flange on its upper or outer end with a plurality of notches of different depths, while the arm is slidable in the column and is provided with an enlargement adapted to abut and be retained in the flange when the arm is set to the inclination determined by the notches. The mirror is carried by the arm and is made adjustable in angular position relatively thereto by a ball and socket joint designed to securely hold the mirror in any adjusted position. If desired, the arm may be telescopic so as to provide a wider range of positions of the mirror, or a shorter compacted arm for the same range.

In the accompanying drawings, illustrating the preferred form and modified details thereof, I show my invention in combination with a portable stand, although it is to be understood that the invention may also be embodied in a variety of forms, such as with a stationary wall support.

In the drawings,

Figure 1 represents a view in elevation, partly broken away, of the adjustable mirror in partially extended position ready for use;

Fig. 2 represents an elevation, partly in section, of the mirror in its compacted and upright arrangement;

Fig. 3 represents an enlarged section of the ball and socket joint for supporting the mirror;

Fig. 4 represents a plan view of the inturned flanged and notched member for supporting the arm in various positions of inclination;

Fig. 5 represents an enlarged view, partly in section, of the inturned and notched end of the column, together with a part of the arm supported therein;

Fig. 6 represents a modified form of telescopic arm.

Referring to Figs. 1 to 5, the base or support 1 embodies material of suitable dimensions to give stability to the mirror in any position to which it may be adjusted, and it is provided with an upstanding column 2 screwed into the base and provided at its upper or outer end with an inturned flange 3 having four notches 4 of different depths. The arm comprises an outer sleeve 5 having an elongated slot 6 closed at its ends, and an inner telescoped part 7 having a pin 8 engaged in the slot so as to permit extension of the arm to any desired length within the range provided, but to prevent relative turning movement of the two parts 5 and 7. The sleeve 5 terminates at its inner end in a member 9 of rectangular section adapted to fit in any of the notches 4, and the ball 10 is fastened on the end of this member. Thus the arm is slidable within the column 2 from the compacted arrangement shown in Fig. 2 to the extended position shown in Fig. 1, wherein the ball 10 abuts and is retained by the inturned flange 3 so as to be capable of universal movement therein. The ball and socket joint formed by the ball 10 and the inturned flange 3 with the notches 4 forms the stepped support for the arm, whereby the arm may be supported in any desired position of inclination by turning the arm until the member 9 drops into the desired notch 4. The telescoped part 7 of the arm carries the mirror 11 at its outer end by a ball and socket joint comprising a ball 12 fastened to the mirror frame and a socket 13 screwed to the end of the arm, the spring pressed member 14 forcing the ball against the socket with sufficient pressure to hold the mirror in any position to which it may be adjusted. A spring 15 is provided at the base of the column 2 for relieving the shock upon dropping the arm to its compacted arrangement.

Instead of the tubular form of the parts 5 and 7 of the arm, I may provide tubular sections 30 and 31 of polygonal form so as to avoid the pin and slot connection for preventing relative turning movements therebetween (see Fig. 6).

It will be observed that while my construction provides for a wide range of extended position and angular setting sufficient for all ordinary use, yet it may be quickly and readily adjusted from one position to any other position merely by pulling and turning the parts by hand. Furthermore, it may be just as readily compacted as shown in Fig. 1, or taken apart by unscrewing the column 2 from the base 1, in order to more easily transport the device, as is often required by traveling theatrical companies.

Having thus described my invention, what I claim is:

1. An adjustable mirror-support comprising a base having an arm-receiving socket provided with a plurality of arm supports in stepped relation to one another, and a mirror-carrying arm mounted to swing laterally and vertically in said socket, whereby the arm may be rested on either of the supports at a corresponding inclination; substantially as described.

2. An adjustable mirror comprising a base, a tubular column extending from said base and provided with an inturned retaining flange at its outer end having a plurality of notches of different depth, an arm slidable in said column and having an enlargement at its end designed to abut and be retained by said flange when the arm rests in the inclined position determined by the respective notch, and a mirror carried by said arm; substantially as described.

3. An adjustable mirror comprising a weighted base, a tubular column upstanding from said base and provided with an inturned retaining flange at its outer end having a plurality of notches of different depths, an arm slidable in said column and having an enlargement at its inner end designed to abut and be retained by said flange when the arm rests in the inclined position determined by the respective notch, and a mirror having a ball and socket connection with said arm; substantially as described.

In testimony whereof I affix my signature, in presence of two witnesses.

FRANK CAPDEVILA.

Witnesses:
H. M. LEWIS,
LEON W. ROSENTHAL.